United States Patent
Yang

(10) Patent No.: US 12,518,245 B2
(45) Date of Patent: Jan. 6, 2026

(54) INVENTORY MONITORING METHOD AND INVENTORY MONITORING SYSTEM

(71) Applicant: Wistron Corporation, New Taipei (TW)

(72) Inventor: Ting-Ru Yang, New Taipei (TW)

(73) Assignee: Wistron Corporation, New Taipei (TW)

( * ) Notice: Subject to any disclaimer, the term of this patent is extended or adjusted under 35 U.S.C. 154(b) by 353 days.

(21) Appl. No.: 18/325,118

(22) Filed: May 30, 2023

(65) Prior Publication Data
US 2024/0378553 A1    Nov. 14, 2024

(30) Foreign Application Priority Data
May 3, 2023   (TW) .................. 112116418

(51) Int. Cl.
*G06Q 10/087*   (2023.01)
(52) U.S. Cl.
CPC .................. *G06Q 10/087* (2013.01)
(58) Field of Classification Search
CPC .......... G06Q 10/087; G06Q 10/06393; G06Q 30/0202; G06F 30/27; G06N 20/00
USPC ............................................ 705/28
See application file for complete search history.

(56) References Cited

FOREIGN PATENT DOCUMENTS

| | | | | |
|---|---|---|---|---|
| CN | 116342034 A | * | 6/2023 | ........... G06Q 10/087 |
| CN | 116664040 A | * | 8/2023 | ........... G06Q 10/087 |
| CN | 118052509 A | * | 5/2024 | ........ G06Q 10/06393 |
| WO | WO-2021072128 A1 | * | 4/2021 | ............. G06N 20/00 |

* cited by examiner

*Primary Examiner* — Russell S Glass
(74) *Attorney, Agent, or Firm* — JCIPRNET

(57) ABSTRACT

An inventory monitoring method and an inventory monitoring system are provided in the disclosure. The inventory monitoring method includes the following steps. Inventory data of a plurality of historical unit periods is obtained. A plurality of inventory turnover days and a plurality of high inventory age indicators of the historical unit periods are generated according to the inventory data of the historical unit periods. A clustering model is established by using the first machine learning algorithm according to the inventory turnover days and the high inventory age indicators of the historical unit periods. An indicator target value associated with the high inventory age indicators is determined according to a clustering result of the clustering model. An inventory health status of a first historical unit period among the historical unit periods is evaluated according to the indicator target value.

18 Claims, 8 Drawing Sheets

INVENTORY MONITORING METHOD AND INVENTORY MONITORING SYSTEM

CROSS-REFERENCE TO RELATED APPLICATION

This application claims the priority benefit of Taiwan application serial no. 112116418 filed on May 3, 2023. The entirety of the above-mentioned patent application is hereby incorporated by reference herein and made a part of this specification.

BACKGROUND

Technical Field

The disclosure relates to an inventory managing method, and in particular relates to an inventory monitoring method and an inventory monitoring system.

Description of Related Art

For the manufacturing industry, the inventory management of materials and products is very important. If the inventory is too high and cannot be turned over efficiently, the company funds are backlogged on the inventory and the interest for depositing the funds in a bank is lost. In addition, sales profits may also be offset by inventory costs, and even lead to losses. Conversely, if the inventory is too low, which leads to the inability for instant delivery or downtime, not only is the credibility of the company damaged, the customer satisfaction also decreases, which even leads to loss of orders. In addition to the inventory turnover rate, the inventory age may also show whether the inventory has accumulated. If the inventory age is too high, it means that the inventory materials cannot be properly consumed or the inventory products do not meet market expectations. Maintaining a healthy inventory turnover rate and inventory age at the same time is a very important goal for inventory management effectiveness.

At present, the common inventory management mechanism is to perform post-event evaluation based on actual data that has actually occurred. However, when an unhealthy inventory or an inventory with a deteriorating trend is detected, it often had already led to great losses. The tight response time and time-consuming tracking of inventory management effectiveness result in an inventory abnormality removal processing that is generally accompanied by high cost losses. Moreover, the inventory management effectiveness cannot be directly determined by a single data. Currently, there is a lack of monitoring tools that allow inventory management personnel to quickly understand the health status of the inventory and track subsequent trends.

SUMMARY

In view of this, an inventory monitoring method and an inventory monitoring system are provided in the present disclosure, in which the inventory monitoring method and the inventory monitoring system may solve the above technical problems.

An embodiment of the disclosure provides an inventory monitoring method, which is adapted for an inventory monitoring system including a processor, and the inventory monitoring method includes the following operation. Inventory data of multiple historical unit periods is obtained. Multiple inventory turnover days and multiple high inventory age indicators of the historical unit periods are generated according to the inventory data of the historical unit periods. A clustering model is established by using a first machine learning algorithm according to the inventory turnover days and the high inventory age indicators of the historical unit periods. An indicator target value associated with the high inventory age indicators is determined according to a clustering result of the clustering model. An inventory health status of a first historical unit period among the historical unit periods is evaluated according to the indicator target value.

An embodiment of the disclosure provides an inventory monitoring system, which includes a storage device and a processor. The storage device stores a database and multiple instructions. The processor, coupled to the storage device, accesses the instructions and is configured to perform the following operations. Inventory data of multiple historical unit periods is obtained from the database. Multiple inventory turnover days and multiple high inventory age indicators of the historical unit periods are generated according to the inventory data of the historical unit periods. A clustering model is established by using a first machine learning algorithm according to the inventory turnover days and the high inventory age indicators of the historical unit periods. An indicator target value associated with the high inventory age indicators is determined according to a clustering result of the clustering model. An inventory health status of a first historical unit period among the historical unit periods is evaluated according to the indicator target value.

Based on the above, in the embodiment of the disclosure, the clustering model may be established according to multiple inventory turnover days and multiple high inventory age indicators of multiple historical unit periods, and the indicator target value associated with the high inventory age indicators may be determined according to a clustering result of the clustering model. The inventory health status of each historical unit period may be evaluated by comparing the indicator target value with the high inventory age indicator of each historical unit period. Therefore, inventory management personnel may better understand the actual inventory situation and the inventory management effectiveness according to the inventory health status of each historical unit period.

DETAILED DESCRIPTION OF DISCLOSED EMBODIMENTS

A portion of the embodiments of the disclosure will be described in detail with reference to the accompanying drawings. Element symbol referenced in the following description will be regarded as the same or similar element when the same element symbol appears in different drawings. These examples are only a portion of the disclosure and do not disclose all possible embodiments of the disclosure. More precisely, these embodiments are only examples of the device and method within the scope of the patent application of the disclosure.

Figure 1:
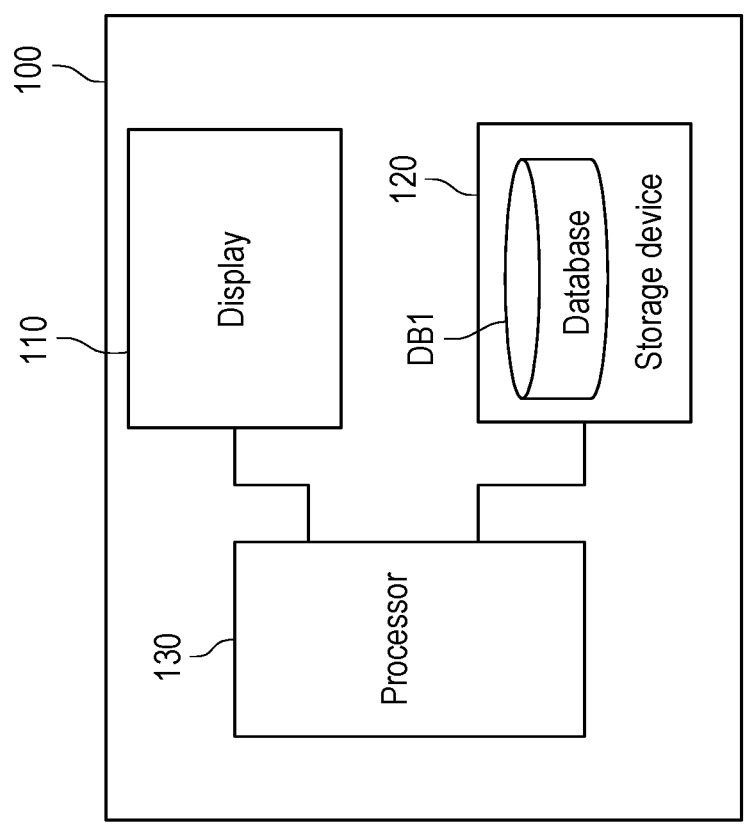
FIG. 1 is a schematic diagram of an inventory monitoring system according to an embodiment of the disclosure.

Referring to FIG. 1, FIG. 1 is a schematic diagram of an inventory monitoring system according to an embodiment of the disclosure. In different embodiments, the inventory monitoring system 100 may be implemented by computer devices with computing power such as laptops, desktops, servers, and workstations, but not limited thereto. The inventory monitoring system 100 may include a display 110, a storage device 120, and a processor 130.

The display 110 is, for example, various types of displays, such as a liquid crystal display (LCD), a light emitting diode (LED) display, and an organic light emitting diode (OLED) built in the computer device, but not limited thereto. In other embodiments, the display 110 may also be any display device externally connected to the computer device.

The storage device 120 is, for example, any type of fixed or removable random access memory (RAM), read-only memory (ROM), flash memory (Flash memory), a solid state hard disk, a hard disk, or other similar devices or a combination of these devices, and may be configured to record multiple instructions, codes, or software modules.

The processor 130 is, for example, a central processing unit (CPU), an application processor (AP), or other programmable general-purpose or special-purpose microprocessor, a digital signal processor (DSP), a graphics processing unit (GPU), an application specific integrated circuit (ASIC), a field programmable gate array circuit (FPGA), or other similar devices, integrated circuits, and combinations thereof. The processor 130 may access and perform the software modules recorded in the storage device 120, so as to implement the inventory monitoring method in the embodiment of the disclosure. The aforementioned software modules may be construed broadly to mean instructions, instruction sets, codes, program codes, programs, applications, software suites, threads, procedures, functions, etc., no matter whether they're referred to as software, firmware, intermediate software, microcode, hardware description language, or others.

Figure 2:
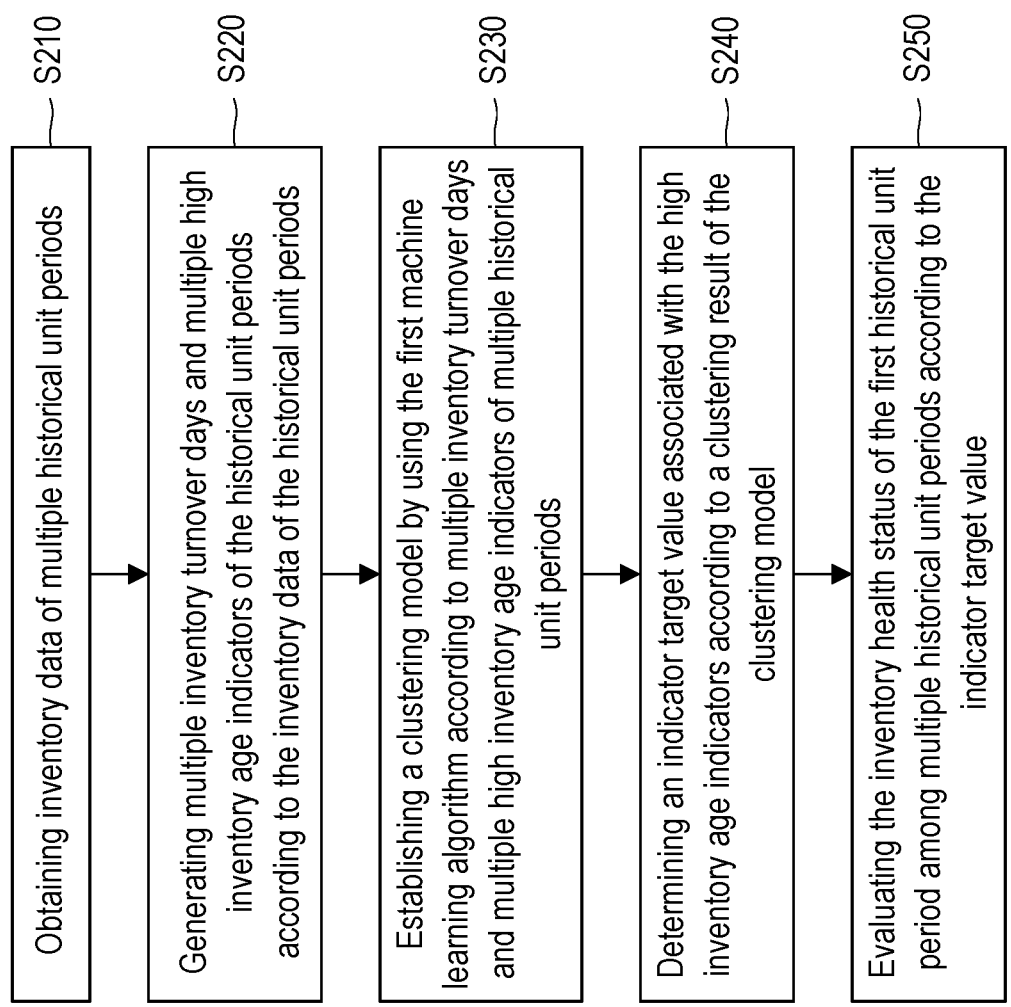
FIG. 2 is a flowchart of an inventory monitoring method according to an embodiment of the disclosure.

FIG. 2 is a flowchart of an inventory monitoring method according to an embodiment of the disclosure. Referring to FIG. 1 and FIG. 2, the method of this embodiment is adapted for the inventory monitoring system 100 in the aforementioned embodiment, and the following in combination with various elements in the inventory monitoring system 100 describes the detailed steps of the inventory monitoring method for replacing the equipment of this embodiment.

In step S210, the processor 130 obtains inventory data of multiple historical unit periods from a database DB1. In some embodiments, the storage device 120 stores a database DB1, and the database DB1 records inventory data of one or more inventory items. The aforementioned inventory items are, for example, products or various production materials. The processor 130 may evaluate the respective inventory health statuses of the historical unit periods according to the inventory data recorded in the database DB1. The time length of the historical unit period is, for example, one month, but the disclosure is not limited thereto. However, in order to clearly illustrate the disclosure, the following embodiments are mainly continued to be described by taking the time length of a historical unit period as one month as an example. For example, the database DB1 may record the inventory data of a certain production material in the past several months. The inventory data corresponding to each historical unit period may include purchase amount (i.e., amount of money), inventory amount (of money), cost of goods sold, and other inventory-related information for each historical unit period.

In step S220, the processor 130 generates multiple inventory turnover days and multiple high inventory age indicators of the historical unit periods according to the inventory data of the historical unit periods. Here, the processor 130 may generate multiple inventory indicators of each historical unit period according to the inventory data of each historical unit period. The inventory indicators of each historical unit period may include an inventory turnover day (i.e., number of days for inventory turnover) and a high inventory age indicator. In addition, the inventory indicator for each historical unit period may also include a target inventory turnover day, a long-term and short-term monitoring indicator, an inventory interest cost, and an inventory ideal amount.

Specifically, the inventory turnover day may indicate the speed of inventory turnover. In some embodiments, the processor 130 may estimate the inventory consumption rate in a certain historical unit period by calculating the ratio of the inventory amount to the cost of goods sold in the historical unit period. The higher the inventory turnover days, the slower the inventory consumption. If the inventory consumption is slower, it is easy to accumulate a higher inventory accumulation cost. For example, taking the length of the historical unit period as one month as an example, the processor 130 may calculate the inventory turnover day (unit in days) of each historical unit period according to the following Formula (1).

Formula (1)

$$\text{Inventory turnover day} = \frac{\frac{(\text{Inventory amount at the beginning of the month} + \text{Inventory amount at the end of the month})}{2}}{\text{Cost of goods sold at the end of the month}} \times 30$$

In addition, the processor 130 may compare the target inventory turnover day with the inventory turnover day to identify whether the inventory turnover is fast or slow. That is to say, the target inventory turnover day is used as a threshold to distinguish whether the inventory turnover is fast or slow. The target inventory turnover day is the target value established by each company considering the sales target of the year and other factors. For example, the target inventory turnover day may be 60 days.

Figure 3:
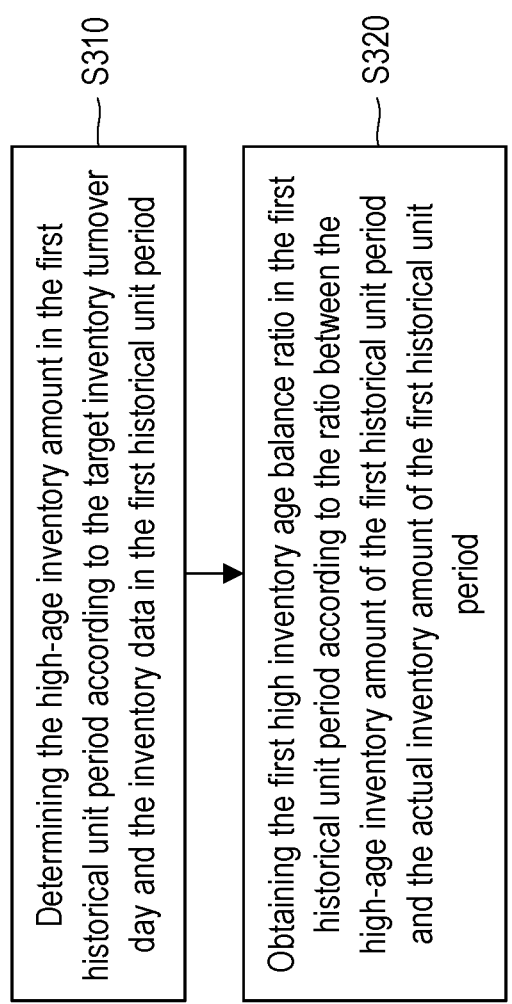
FIG. 3 is a flowchart for calculating the high inventory age balance ratio according to an embodiment of the disclosure.

In some embodiments, the high inventory age indicator for each historical unit period may include a high inventory age balance ratio. FIG. 3 is a flowchart for calculating the high inventory age balance ratio according to an embodiment of the disclosure. That is to say, in some embodiments, step S220 may include step 310 to step S320. It should be noted that the calculation method of the high inventory age indicator in each historical unit period are similar, and the first historical unit period is used for illustration below.

In step S310, the processor 130 determines the high-age inventory amount in the first historical unit period according to the target inventory turnover day and the inventory data in the first historical unit period. Specifically, the inventory data of the first historical unit period includes inventory amounts corresponding to different inventory ages, and the target inventory turnover day may be used to identify the inventory as high-age inventory or non-high-age inventory. The processor 130 may add up the inventory amount of the high-age inventory whose inventory age is greater than the target inventory turnover day, so as to obtain the high-age inventory amount of the first historical unit period. For example, assuming that the target inventory turnover day is 60 days, the processor 130 may add up the inventory amount of the inventory whose inventory age is greater than 60 days to obtain the high-age inventory amount in the first historical unit period.

In step S320, the processor 130 obtains the first high inventory age balance ratio in the first historical unit period according to the ratio between the high-age inventory amount of the first historical unit period and the inventory amount of the first historical unit period. For example, taking the length of the first historical unit period as one month as an example, the processor 130 may calculate the first high inventory age balance ratio of the first historical unit period according to the following Formula (2).

$$\text{High inventory age balance ratio (\%)} = \frac{\text{High-age inventory amount}}{\text{Inventory amount at the end of the month}} \times 100\% \quad \text{Formula (2)}$$

In some embodiments, the long-term and short-term monitoring indicator may be used to evaluate the health trend of the inventory. The processor 130 may obtain the change trend of the inventory turnover day by comparing the short-term (e.g., the recent 3 months) average inventory turnover day with the long-term (e.g., the recent 12 months) average inventory turnover day. In addition, the processor 130 may obtain the change trend of the high inventory age balance ratio by comparing the short-term (e.g., the recent 3 months) average high inventory balance ratio with the long-term (e.g., the recent 12 months) average high inventory balance ratio. The long-term and short-term monitoring indicators may be used to highlight the time points when inventory effectiveness is unhealthy, and may be used to confirm whether inventory management measures are gradually improving the inventory trend.

Specifically, if the short-term average inventory turnover day is less than the long-term average inventory turnover day, it means that the recent turnover speed has become faster. I the short-term average inventory turnover day is greater than the long-term average inventory turnover day, it means that the recent turnover speed has become slower. If the short-term high inventory age balance ratio is less than the long-term high inventory age balance ratio, it means that the recent inventory age has become younger. If the short-term high inventory age balance ratio is greater than the long-term high inventory age balance ratio, it means that the recent inventory age has become older.

In some embodiments, when the inventory turnover is not as expected, the high inventory age balance causes an enterprise to lose out on the interest from the amount of money when placed in a bank, which is referred to as inventory interest cost. For example, the processor 130 may calculate the inventory interest cost of the first historical unit period according to the following Formula (3).

$$\text{Inventory interest cost} = \frac{\text{High-age inventory amount} \times \text{Annual interest rate (\%)}}{12} \quad \text{Formula (3)}$$

The annual interest rate may be determined according to the interest rate announced by the financial institution.

In some embodiments, the low inventory amount may prevent the loss of interest costs caused by backlogging the company funds on the inventory, but an inventory amount that is too low may not be able to meet the order demand or production demand. Therefore, the inventory amount that is just enough to cover future sales may be defined as the inventory ideal amount. The processor 130 may generate an inventory ideal amount according to the target inventory turnover day. For example, the processor 130 may calculate the inventory ideal amount according to the following Formula (4).

$$\text{Inventory ideal amount} = \frac{\text{Target inventory turnover day} \times \text{Average cost of goods sold prediction value}}{30} \quad \text{Formula (4)}$$

When the target inventory turnover day is less than 1 month, the average cost of goods sold prediction value is the cost of goods sold prediction value of the next month. When the target inventory turnover day is between 1 and 2 months, the average cost of goods sold prediction value is the average value of the cost of goods sold prediction value of the next 2 months, so on and so forth.

In some embodiments, the processor 130 may control the display 110 to display an inventory health evaluation interface including multiple inventory indicators. That is, after the inventory management personnel selects a certain historical unit period, the inventory health evaluation interface presents multiple inventory indicators of the selected historical unit period. The inventory management personnel may reflect more instantly the actual inventory situation and trends from the data by inspecting various inventory indicators.

It is worth mentioning that whether the inventory turnover is fast or slow may be known by comparing the target inventory turnover day with the actual inventory turnover day, but the inventory age being relatively young or aging has traditionally lacked a target value for identification that is set according to rules of experience. Therefore, in the embodiment of the disclosure, the processor 130 may perform clustering for multiple historical unit periods, so as to obtain the indicator target value of the high inventory age indicator according to the clustering result. The aforementioned indicator target value is also an inventory indicator for each historical unit period.

Returning to FIG. 2, in step S230, the processor 130 uses the first machine learning algorithm to establish a clustering model according to multiple inventory turnover days and multiple high inventory age indicators of multiple historical unit periods. In step S240, the processor 130 determines an indicator target value associated with the high inventory age indicators according to a clustering result of the clustering model.

In some embodiments, the first machine learning algorithm is, for example, K-means algorithm or other clustering algorithms. In detail, the processor 130 may use the inventory turnover days and the high inventory age indicators of each historical unit period as model feature variables to cluster these historical unit periods, thereby establishing a clustering model. In other words, the processor 130 may cluster multiple historical unit periods into multiple sample clusters. The processor 130 may determine an indicator target value associated with the high inventory age indicators according to the cluster boundaries of these sample clusters.

More specifically, in some embodiments, it is assumed that the high inventory age indicator is a high inventory age balance ratio. The processor 130 may cluster multiple historical unit periods into multiple sample clusters (e.g., 3 sample clusters or 4 sample clusters) according to multiple inventory turnover days and multiple high inventory age balance ratios corresponding to multiple historical unit periods. The processor 130 may determine the indicator target value associated with the high inventory age balance ratio according to the cluster boundaries of these sample clusters for the high inventory age balance ratio. The indicator target value is a threshold value used to evaluate whether a high inventory age balance ratio is good or bad.

In some embodiments, the processor 130 may sort the high inventory age balance ratios of multiple historical unit periods in the first sample cluster, and generate an indicator target value according to statistical results of the top several high inventory age balance ratios (e.g., the top 10 high inventory age balance ratios) in the first sample cluster. Alternatively, the processor 130 may generate an indicator target value according to the largest high inventory age balance ratio among the sorted high inventory age balance ratios. For example, the processor 130 may subtract or add a preset value to the aforementioned maximum high inventory age balance ratio to generate an indicator target value.

In some embodiments, the processor 130 may display the setting interface of the indicator target value through the display 110 according to multiple inventory turnover days and multiple high inventory age balance ratios respectively corresponding to multiple historical unit periods. The setting interface includes a data scatter diagram showing data points corresponding to multiple historical unit periods. The vertical axis of the data scatter diagram represents the high inventory age balance ratio of the historical unit period, and the horizontal axis of the data scatter diagram represents the inventory turnover day of the historical unit period. Inventory management personnel may set the indicator target value by viewing the data scatter diagram. In some embodiments, the processor 130 may use a Rand index to evaluate the similarity between the clustering result based on the manually set indicator target value and the clustering result of the clustering model. If the above similarity meets the similarity condition, the processor 130 may take the smaller value between the manually set indicator target value and the indicator target value generated by the clustering model as the final indicator target value.

In step S250, the processor 130 evaluates the inventory health status of the first historical unit period among multiple historical unit periods according to the indicator target value. In some embodiments, the processor 130 may classify the inventory health status of the first historical unit period into multiple risk statuses by comparing the first inventory turnover day of the first historical unit period with the target inventory turnover day and comparing the first high inventory age indicator of the first historical unit period with the indicator target value.

In some embodiments, the processor 130 may generate a reminder message according to the inventory health status of the first historical unit period. For example, the processor 130 may display a warning message through the inventory health evaluation interface displayed on the display 110, or send an email or a short message including the inventory health status of the first historical unit period to the electronic device of the equipment management personnel.

In some embodiments, in response to the first inventory turnover day of the first historical unit period being less than the target inventory turnover day and the first high inventory age balance ratio of the first historical unit period being less than the indicator target value, the processor 130 determines that the inventory health status of the first historical unit period is the first risk status. That is to say, the first risk status may be a low risk status, representing a good inventory status. In response to the first inventory turnover day of the first historical unit period being greater than the target inventory turnover day and the first high inventory age balance ratio of the first historical unit period being greater than the indicator target value, the processor 130 determines that the inventory health status of the first historical unit period is the second risk status. That is to say, the second risk status may be an unhealthy status, representing an inventory status that is not good.

In some embodiments, in response to the first inventory turnover day of the first historical unit period being greater than the target inventory turnover day but the first high inventory age balance ratio of the first historical unit period being less than the indicator target value, the processor 130 determines that the inventory health status of the first historical unit period is the third risk status. In response to the first inventory turnover day of the first historical unit period being less than the target inventory turnover day but the first high inventory age balance ratio of the first historical unit period being greater than the indicator target value, the processor 130 determines that the inventory health status of the first historical unit period is the third risk status. That is to say, the third risk status may be a medium risk status.

In some embodiments, the processor 130 may display an inventory health evaluation interface including the inventory health status of the first historical unit period through the display 110. The inventory health evaluation interface includes a scatter diagram generated according to multiple inventory turnover days and multiple high inventory age indicators of multiple historical unit periods.

Figure 4:
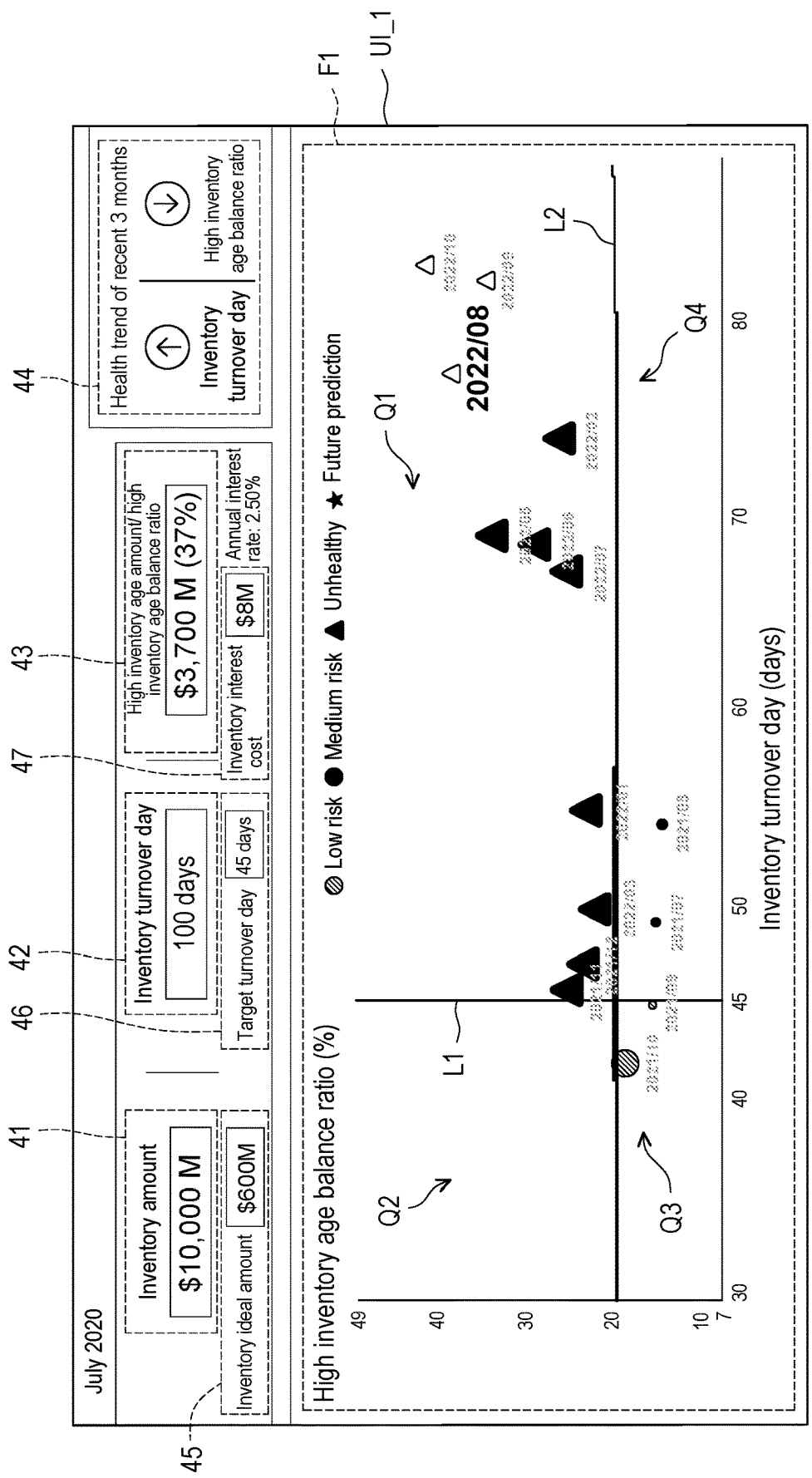
FIG. 4 is a schematic diagram of an inventory health evaluation interface according to an embodiment of the disclosure.

For example, referring to FIG. 4, FIG. 4 is a schematic diagram of an inventory health evaluation interface according to an embodiment of the disclosure. The display 110 may display an inventory health evaluation interface UI_1. For example, the inventory health evaluation interface UI_1 displays multiple inventory indicators of the historical unit period "July 2022". According to the inventory indicator generating method of the aforementioned embodiment, the processor 130 may generate multiple inventory indicators of the historical unit period "July 2022" according to the inventory data of the historical unit period "July 2022" and other historical unit periods. Therefore, the inventory health evaluation interface UI_1 displays the inventory amount 41, the inventory turnover day 42, the high inventory age balance ratio 43, the long-term and short-term monitoring indicators 44, the inventory ideal amount 45, the target inventory turnover day 46, and the inventory interest cost 47.

In addition, the inventory health evaluation interface UI_1 displays a scatter diagram F1. The horizontal axis of the scatter graph F1 represents the inventory turnover day, and the vertical axis of the scatter graph F1 represents the high inventory age balance ratio. The line L1 represents the target inventory turnover day, and the line L2 represents the indicator target value generated according to the clustering result. The line L1 and the line L2 may divide the scatter diagram F1 into four quadrants. As shown in FIG. 4, the inventory health status of the historical unit period falling in the first quadrant Q1 is unhealthy. The inventory health status of the historical unit period falling in the third quadrant Q3 is low risk. The inventory health status of the historical unit period falling in the second quadrant Q2 and the fourth quadrant Q4 is medium risk. Thereby, the inventory management personnel may quickly and intuitively understand the respective inventory health statuses of these historical unit periods by observing multiple historical unit periods respectively falling in different quadrants in the scatter diagram F1. Different risk statuses may be displayed according to different visual effects, for example, different shape symbols are used to present different risk statuses.

A fast inventory turnover and a young inventory are the characteristics of a healthy inventory. Embodiments of the disclosure may generate a plurality of inventory indicators to facilitate the quantification and visualization of inventory health status, and also cooperate with automatic evaluation of inventory health status. Therefore, it may assist inventory management personnel to be more sensitive to the abnormal information behind the data.

In some embodiments, the processor 130 may generate an inventory health evaluation report according to multiple inventory indicators of a historical unit period. In some embodiments, the inventory health evaluation report may include the total inventory amount of the historical unit period. The inventory health evaluation report may also include a comparison result between the inventory amount of the historical unit period (e.g., July) and the inventory amount of the previous historical unit period (e.g., June). In some embodiments, the inventory health evaluation report may include a comparison result between the cost of goods sold of the historical unit period (e.g., July) and the cost of goods sold of the previous historical unit period (e.g., June). Based on the comparison result of the inventory amount and the cost of goods sold of two adjacent historical unit periods, the processor 130 may evaluate whether the inventory turnover rate of the historical unit period is good or bad, and present it in the inventory health evaluation report.

In some embodiments, the processor 130 may also generate an inventory health evaluation report including a comparison result between two high-age inventory amounts of two adjacent historical unit periods. In some embodiments, based on the long-term and short-term monitoring indicators, the processor 130 may evaluate the inventory health trend in recent months compared with the past year, and present it in the inventory health evaluation report.

Figure 5:
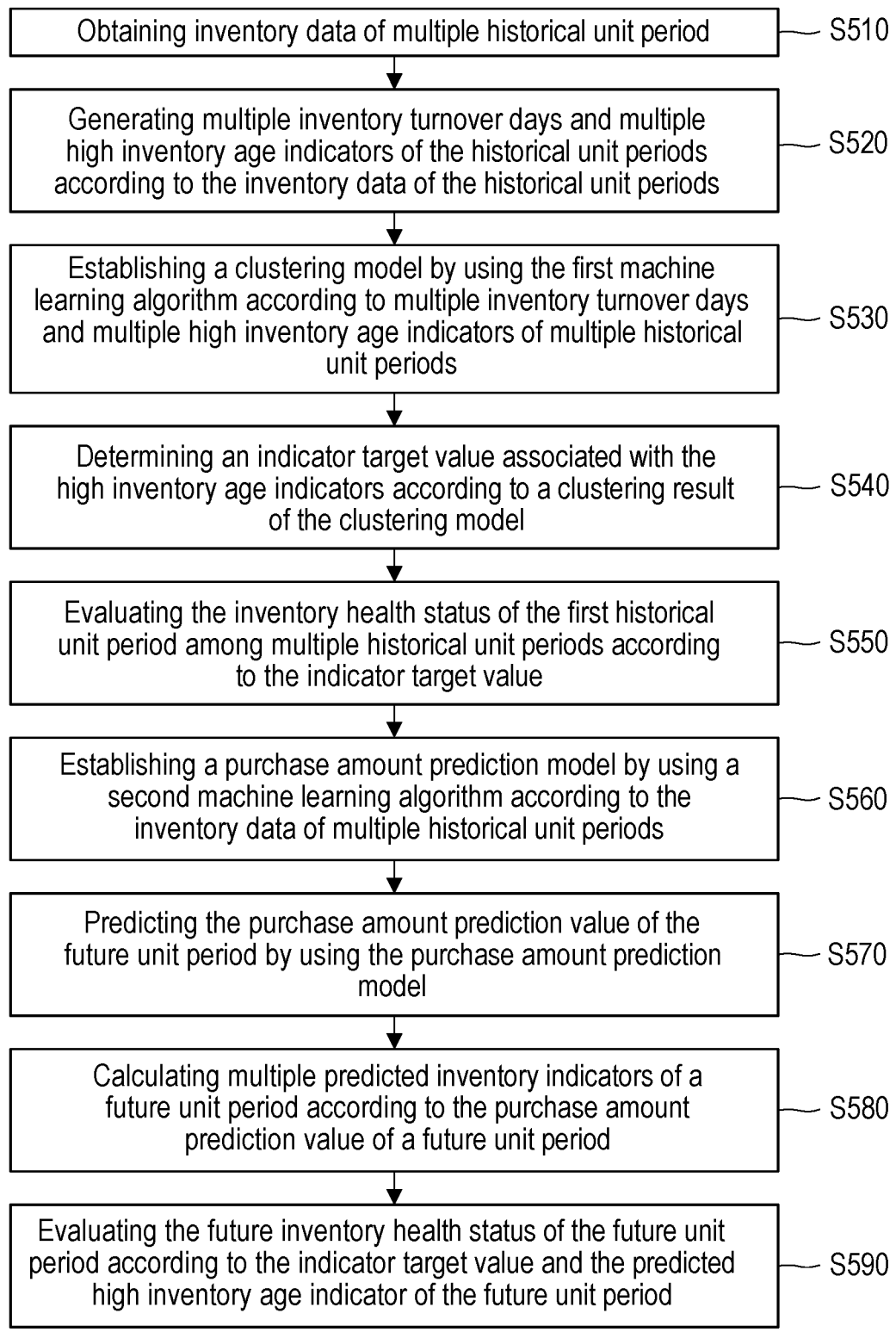
FIG. 5 is a flowchart of an inventory monitoring method according to an embodiment of the disclosure.

FIG. 5 is a flowchart of an inventory monitoring method according to an embodiment of the disclosure. Referring to FIG. 1 and FIG. 5, the method of this embodiment is adapted for the inventory monitoring system 100 in the aforementioned embodiment, and the following in combination with various elements in the inventory monitoring system 100 describes the detailed steps of the inventory monitoring method for replacing the equipment of this embodiment.

In step S510, the processor 130 obtains inventory data of multiple historical unit periods from a database DB1. In step S520, the processor 130 generates multiple inventory turnover days and multiple high inventory age indicators of the historical unit periods according to the inventory data of the historical unit periods. In step S530, the processor 130 uses the first machine learning algorithm to establish a clustering model according to multiple inventory turnover days and multiple high inventory age indicators of multiple historical unit periods. In step S540, the processor 130 determines an indicator target value associated with the high inventory age indicators according to a clustering result of the clustering model. In step S550, the processor 130 evaluates the inventory health status of the first historical unit period among multiple historical unit periods according to the indicator target value. For the implementation details of step S510 to step S550, reference may be made to the description of the foregoing embodiments, and details are not repeated herein.

It should be noted that the processor 130 may also generate an inventory indicator of a future unit period and evaluate a future inventory health status of a future unit period. For example, if the current time is Dec. 10, 2022, the future unit period may be December 2022 or other future months thereafter. Specifically, the inventory is the result of integrating purchases and sales. Based on the relationship between purchases, sales, and the remaining inventory, if the purchase amount and sales amount per unit period in the future may be accurately predicted, then the inventory amount and multiple inventory indicators in the future unit period may be predicted. Compared with directly using a machine learning model to predicted the inventory amount of the future unit period, the embodiments of the disclosure may provide more interpretable predictions for inventory management.

Therefore, in step S560, the processor 130 uses a second machine learning algorithm to establish a purchase amount prediction model according to the inventory data of multiple historical unit periods. In step S570, the processor 130 uses the purchase amount prediction model to predict the purchase amount prediction value of the future unit period.

The processor 130 may extract multiple feature variables related to the purchase amount from the known past data and known future data related to the inventory. In some embodiments, these feature variables may include the purchase amount of the historical unit period, the factory manufacturing cost of the historical unit period, the cost of goods sold of the historical unit period, and the inventory amount of the historical unit period, etc. In some embodiments, these feature variables may also include cost of goods sold of the future unit period and the factory manufacturing costs of the future unit period, etc. In addition, the processor 130 may also generate other feature variables according to the weighting operation or statistical operation of the above feature variables.

In some embodiments, the processor 130 may perform feature selection during the model training process to determine important feature variables that are highly correlated with the predicted purchase amount of a future unit period. The processor 130 may use the second machine learning algorithm and these important feature variables to train the purchase amount prediction model. In some embodiments, the second machine learning algorithm may be a gradient boosting decision tree algorithm, such as a light gradient boosting machine (LGBM) algorithm, but not limited thereto. The model parameters of the trained purchase amount prediction model may be recorded in the storage device 120. That is to say, the purchase amount prediction model is a prediction model created by the processor 130 after performing machine learning according to the training data set to estimate the predicted purchase amount of a future unit period. For example, the trained purchase amount prediction model may predict the predicted purchase amount of next month according to the inventory data (e.g., the inventory amount) of the past 3 months and the sales planning data of the next two months (e.g., the cost of goods sold prediction value).

$$\text{Predicted inventory amount} = A + B - C \qquad \text{Formula (5)}$$

$$\text{Predicted inventory turnover day} = \frac{\frac{(A + \text{Predicted inventory amount})}{2} \times 30}{C} \qquad \text{Formula (6)}$$

A is the inventory amount of the previous unit period (e.g., last month) of a future unit period; B is the purchase amount prediction value of the future unit period; C is the cost of goods sold prediction value of the future unit period.

For example, assuming that today is Dec. 10, 2022, Table 1 below illustrates the generating method of the predicted turnover day for the next 3 months.

TABLE 1

| Date | Inventory amount of the previous month | Cost of goods sold of this month | Inventory amount of this month | Predicted inventory turnover day |
|---|---|---|---|---|
| 2022 Dec. 31 | 800,000 (Has occurred) | 600,000 (planned) | 1,000,000 (Generated based on the purchase amount prediction value in December) | $\frac{(800,000 + 1,000,000)}{2} \times 30 / 600,000 = 45$ |
| 2023 Jan. 31 | 1,000,000 (Inventory amount of December) | 900,000 (planned) | 500,000 (Generated based on the purchase amount prediction value in January) | $\frac{(1,000,000 + 500,000)}{2} \times 30 / 900,000 = 25$ |
| 2023 Feb. 28 | 500,000 (Inventory amount of January) | 600,000 (planned) | 700,000 (Generated based on the purchase amount prediction value in February) | $\frac{(500,000 + 700,000)}{2} \times 30 / 600,000 = 20$ |

In step S580, the processor 130 calculates multiple predicted inventory indicators of a future unit period according to the purchase amount prediction value of a future unit period. In some embodiments, the predicted inventory indicators of a future unit period may include the predicted inventory amount, the predicted inventory turnover day, and the predicted high inventory age indicator. In addition, in some embodiments, the predicted inventory indicators of a future unit period may also include the predicted inventory ideal amount and the predicted inventory interest cost.

Figure 6:
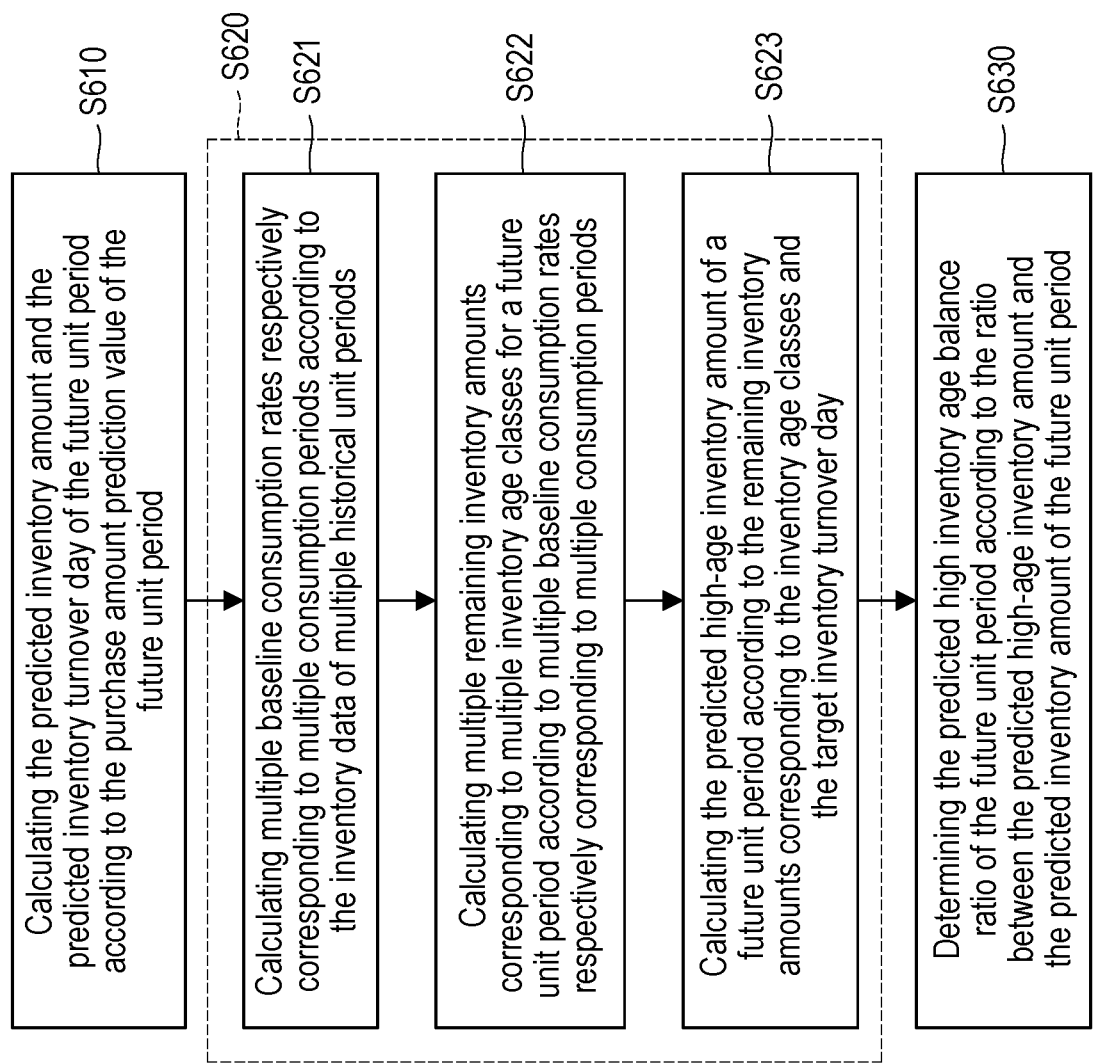
FIG. 6 is a flowchart for determining multiple predicted inventory indicators for a future period according to an embodiment of the disclosure.

FIG. 6 is a flowchart for determining multiple predicted inventory indicators for a future period according to an embodiment of the disclosure. In some embodiments, step S580 may include step S610 to step S630.

In step S610, the processor 130 calculates the predicted inventory amount and the predicted inventory turnover day of the future unit period according to the purchase amount prediction value of the future unit period. Specifically, after the purchase amount prediction model utilized by the processor 130 generates the purchase amount prediction value of the future unit period, the processor 130 may calculate the predicted inventory amount and the predicted inventory turnover day of the future unit period. For example, the processor 130 may calculate the predicted inventory amount of the future unit period according to the following Formula (5), and calculate the predicted inventory turnover day of the future unit period according to the following Formula (6).

It may be seen that based on the purchase amount prediction value of the future unit period, in the case where the cost of goods sold prediction value of a future unit period has been planned, the processor 130 may obtain the predicted inventory amount and the predicted inventory turnover day of a future unit period through Formula (5) and Formula (6). In this way, the speed of inventory turnover of a future unit period may be evaluated according to the predicted inventory amount, so that inventory management personnel may know the inventory status of a future unit period in advance.

In some embodiments, the processor 130 may calculate a predicted high inventory age indicator of a future unit period according to the item consumption rate and the target inventory turnover day. The item consumption rate may be defined as the consumption rate of a single purchase respectively in multiple consecutive consumption periods. According to the consumption rate and target inventory turnover day of a single purchase respectively in multiple consumption periods, the processor 130 may calculate the high-age inventory amount of the future unit period, so as to further determine the predicted high inventory age indicator of the future unit period.

In the example shown in FIG. 6, the predicted high inventory age indicator includes the predicted high inventory age balance ratio of the future unit period. Therefore, in step S620 and step S630, the processor 130 respectively calculates the predicted high-age inventory amount of the future unit period and the predicted high inventory age balance ratio of the future unit period. In step S620, the processor 130 may calculate the predicted high-age inventory amount of a future unit period according to the item consumption rate and the target inventory turnover day. Step S620 may be implemented as step S621 to step S623.

In step S621, the processor 130 calculates multiple baseline consumption rates respectively corresponding to multiple consumption periods according to the inventory data of multiple historical unit periods. In some embodiments, the inventory age of the inventory may be divided into multiple inventory age classes. A batch of production raw materials purchased in March will be gradually consumed in April, May, or subsequent months. Before this batch of production raw materials is not used, the inventory age of this batch of production raw materials will increase day by day. From another point of view, inventories with an inventory age of less than 30 days may be classified as the first inventory age class, that is, the inventory age class of inventory that has been put into storage within one month. Inventories with an inventory age between 30 days and 60 days may be classified as the second inventory age class, that is, the inventory age class of inventories that has been put into storage for one to two months. Similarly, inventories with an inventory age between 60 days and 90 days may be classified as the third inventory age class, that is, the inventory age class of inventories that has been put into storage for two to three months.

For example, assuming that the purchase amount in March is 1,000,000 and the inventory amount of the inventory age class "under 30 days" settled at the end of March is 800,000, it represents that 200,000 from this batch of purchases in March were consumed within one month. In April, the processor 130 may obtain the consumption of the batch of purchases in March within the second month of purchase according to the remaining 800,000 of this batch of purchases in March and the inventory amount of the inventory age class "31 days to 60 days" settled at the end of April. Assuming that the inventory amount of the inventory age class "31 days to 60 days" settled at the end of April is 400,000, then the consumption of this batch of purchases in March within the second month of purchase is 400,000 (i.e., 800,000−400,000=400,000). Similarly, in May, the processor 130 may obtain the consumption of the batch of purchases in March within the third month of purchase according to the remaining 400,000 of this batch of purchases in March and the inventory amount of the inventory age class "61 days to 90 days" settled at the end of May. Assuming that the inventory amount of the inventory age class "61 days to 90 days" settled at the end of May is 100,000, then the consumption quantity of this batch of purchases in March within the third month of purchase is 300,000 (i.e., 400,000−100,000=300,000). Therefore, the processor 130 may obtain the consumption quantity of the batch of purchases in March from March to May, which is respectively 200,000, 400,000, and 300,000. Therefore, the processor 130 may calculate multiple baseline consumption rates respectively corresponding to multiple consumption periods according to the ratio between the purchase amount of 1,000,000 in March and the consumption quantity corresponding to the consumption periods (i.e., March to May). The baseline consumption rates are respectively 20%, 40%, and 30%.

For example, based on the known inventory amounts from March to June, the processor 130 may analyze 4 baseline consumption rates corresponding to 4 consumption periods for the purchase in March based on the following Formula (7-1) to Formula (7-4).

$$\text{Baseline consumption rate of the first month of purchase} = \frac{\text{(Purchase amount in March−Inventory amount of "1 day to 30 days" in March)}}{\text{Purchase amount in March}} \quad \text{Formula (7-1)}$$

$$\text{Baseline consumption rate of the second month of purchase} = \frac{\text{(Inventory amount of "1 day to 30 days" in March−Inventory amount of "31 day to 60 days" in April)}}{\text{Purchase amount in March}} \quad \text{Formula (7-2)}$$

$$\text{Baseline consumption rate of the third month of purchase} = \frac{\text{(Inventory amount of "31 day to 60 days" in April−Inventory amount of "61 day to 90 days" in May)}}{\text{Purchase amount in March}} \quad \text{Formula (7-3)}$$

$$\text{Baseline consumption rate of the fourth month of purchase} = \frac{\text{(Inventory amount of "61 day to 90 days" in May−Inventory amount of "91 day to 120 days" in June)}}{\text{Purchase amount in March}} \quad \text{Formula (7-4)}$$

In addition to analyzing multiple baseline consumption rates corresponding to multiple consumption periods for purchases in March, the processor 130 may also analyze multiple baseline consumption rates corresponding to multiple consumption periods for purchases in other historical unit periods in the same manner. Afterwards, the processor 130 may perform an averaging operation on multiple baseline consumption rates corresponding to the same consumption period to obtain a final baseline consumption rate.

For example, the processor 130 may perform the aforementioned consumption analysis on purchases in March, and obtain 6 baseline consumption rates corresponding to 6 consumption periods. The time length of a consumption period is 1 month. These 6 baseline consumption rates represent the consumption ratios of the purchased materials in 6 consecutive consumption periods. Similarly, the processor 130 may perform the aforementioned consumption analysis on purchases in April, and respectively obtain 6 baseline consumption rates corresponding to 6 consumption periods. Similarly, the processor 130 may perform the aforementioned consumption analysis on purchases in June, and respectively obtain 6 baseline consumption rates corresponding to 6 consumption periods. Afterwards, the processor 130 may average the three baseline consumption rates corresponding to the first consumption period to obtain a final baseline consumption rate corresponding to the first consumption period. Similarly, the processor 130 may obtain five final baseline consumption rates respectively corresponding to the second consumption period to the sixth consumption period through average calculation. For example, the six final baseline consumption rates may be, for example, 25%, 23%, 20%, 15%, 10%, and 5%.

Next, in step S622, the processor 130 calculates multiple remaining inventory amounts corresponding to multiple inventory age classes for a future unit period according to multiple baseline consumption rates respectively corresponding to multiple consumption periods. In step S623, the processor 130 calculates the predicted high-age inventory amount of a future unit period according to the remaining inventory amounts corresponding to the inventory age classes and the target inventory turnover day.

Assuming that it is now the beginning of December 2022 and the baseline consumption rates corresponding to the first month to the sixth month are 25%, 23%, 20%, 15%, 10%, and 5%, the calculation method for the remaining inventory amount of the 6 storage age classes at the end of December is shown in Table 2 below.

TABLE 2

| | |
|---|---|
| Remaining inventory amount of the first inventory age class | Purchase amount prediction value of December × (100%-25%) |
| Remaining inventory amount of the second inventory age class | Purchase amount prediction value of November × (100%-25%-23%) |
| Remaining inventory amount of the third inventory age class | Purchase amount prediction value of October × (100%-25%-23%-20%) |
| Remaining inventory amount of the fourth inventory age class | Purchase amount prediction value of September × (100%-25%-23%-20%-15%) |
| Remaining inventory amount of the fifth inventory age class | Purchase amount prediction value of August × (100%-25%-23%-20%-15%-10%) |
| Remaining inventory amount of the sixth inventory age class | Purchase amount prediction value of July × (100%-25%-23%-20%-15%-10%-5%) |

The first inventory age class is "less than 31 days"; the second inventory age class is "31 days to 60 days"; the third inventory age class is "61 days to 90 days"; the fourth inventory age class is "91 days to 120 days"; the fifth inventory age class is "121 days to 150 days"; the sixth inventory age class is "151 days to 180 days". According to the example in Table 2, if the target inventory turnover day is 60 days, it means that the inventory from the third inventory age class to the sixth inventory age class is high-age inventory. Therefore, the processor 130 may add up the 4 entries of remaining inventory amounts from the third inventory age class to the sixth inventory age class to obtain the predicted high-age inventory amount of the future unit period (i.e., December).

Alternatively, assuming that it is now the beginning of December 2022 and the baseline consumption rates corresponding to the first month to the sixth month are 25%, 23%, 20%, 15%, 10%, and 5%, the calculation method for the remaining inventory amount of the 6 storage age classes at the end of February 2023 is shown in Table 3 below.

TABLE 3

| | |
|---|---|
| Remaining inventory amount of the first inventory age class | Purchase amount prediction value of February × (100%-25%) |
| Remaining inventory amount of the second inventory age class | Purchase amount prediction value of January × (100%-25%-23%) |
| Remaining inventory amount of the third inventory age class | Purchase amount prediction value of December × (100%-25%-23%-20%) |
| Remaining inventory amount of the fourth inventory age class | Purchase amount prediction value of November × (100%-25%-23%-20%-15%) |
| Remaining inventory amount of the fifth inventory age class | Purchase amount prediction value of October × (100%-25%-23%-20%-15%-10%) |
| Remaining inventory amount of the sixth inventory age class | Purchase amount prediction value of September × (100%-25%-23%-20%-15%-10%-5%) |

The first inventory age class is "less than 31 days"; the second inventory age class is "31 days to 60 days"; the third inventory age class is "61 days to 90 days"; the fourth inventory age class is "91 days to 120 days"; the fifth inventory age class is "121 days to 150 days"; the sixth inventory age class is "151 days to 180 days". According to the example in Table 3, if the target inventory turnover day is 90 days, it means that the inventory from the fourth inventory age class to the sixth inventory age class is high-age inventory. Therefore, the processor 130 may add up the 3 entries of remaining inventory amounts from the fourth inventory age class to the sixth inventory age class to obtain the predicted high-age inventory amount of the future unit period (i.e., February).

That is to say, since the high-age inventory is generated due to slower consumption than expected, it is different from directly building a model to predict the high inventory age balance. In this embodiment, the predicted high-age inventory amount of the future unit period may be calculated by analyzing the consumption rate generated.

In step S630, the processor 130 determines the predicted high inventory age balance ratio of the future unit period according to the ratio between the predicted high-age inventory amount and the predicted inventory amount of the future unit period. For example, the processor 130 may calculate the predicted high inventory age balance ratio of a future unit period according to the following Formula (8).

$$\text{Predicted high inventory age balance ratio} = 100\% \times (\text{predicted high-age inventory amount} / \text{predicted inventory amount}) \quad \text{Formula (8)}$$

Returning to FIG. 5, in step S590, the processor 130 evaluates the future inventory health status of the future unit period according to the indicator target value and the predicted high inventory age indicator of the future unit period. In some embodiments, the processor 130 may determine the future inventory health status of the future unit period according to the comparison result between the predicted high inventory age balance ratio of the future unit period and the indicator target value.

According to the embodiment in FIG. 5, the inventory monitoring system 100 may derive the predicted inventory amount, the predicted inventory turnover day, the predicted high inventory age balance ratio, the inventory ideal amount, and the interest cost only through predicting the purchase amount prediction value of the future unit period, such that the overall inventory monitoring analysis results are more consistent and interpretable. In addition, estimating the purchase amount prediction value of the future unit period from only the purchase order often has the problem of greatly misestimating the purchase amount, resulting in inaccurate derivation of the inventory amount and turnover day. The reason is that the actual purchase may not always arrive on time as planned. However, in the embodiment of the disclosure, the purchase amount prediction value is predicted through a machine learning model, and the purchase amount prediction value is predicted by comprehensively considering multiple important feature variables, which may effectively improve the prediction accuracy.

In some embodiments, in response to the predicted inventory turnover day of the future unit period being less than the target inventory turnover day and the predicted high inventory age balance ratio of the future unit period being less than the indicator target value, the processor 130 determines that the future inventory health status of the future unit period is the first risk status. That is to say, the first risk status may be a low risk status, representing a good inventory status. In response to the predicted inventory turnover day of the future unit period being greater than the target inventory turnover day and the predicted high inventory age balance ratio of the future unit period being greater than the indicator target value, the processor 130 determines that the future inventory health status of the future unit period is the second risk status. That is to say, the second risk status may be an unhealthy status, representing an inventory status that is not good.

In some embodiments, in response to the predicted inventory turnover day of the future unit period being greater than the target inventory turnover day but the predicted high inventory age balance ratio of the future unit period being less than the indicator target value, the processor 130 determines that the future inventory health status of the future unit period is the third risk status. In response to the predicted inventory turnover day of the future unit period being less than the target inventory turnover day but the predicted high inventory age balance ratio of the future unit period being greater than the indicator target value, the processor 130 determines that the future inventory health status of the future unit period is the third risk status. That is to say, the third risk status may be a medium risk status.

In some embodiments, the processor 130 may display an inventory health evaluation interface including the future inventory health status of the future unit period through the display 110. The inventory health evaluation interface includes a scatter diagram generated according to multiple predicted inventory turnover days and multiple predicted high inventory age indicators of multiple future unit periods.

Figure 7:
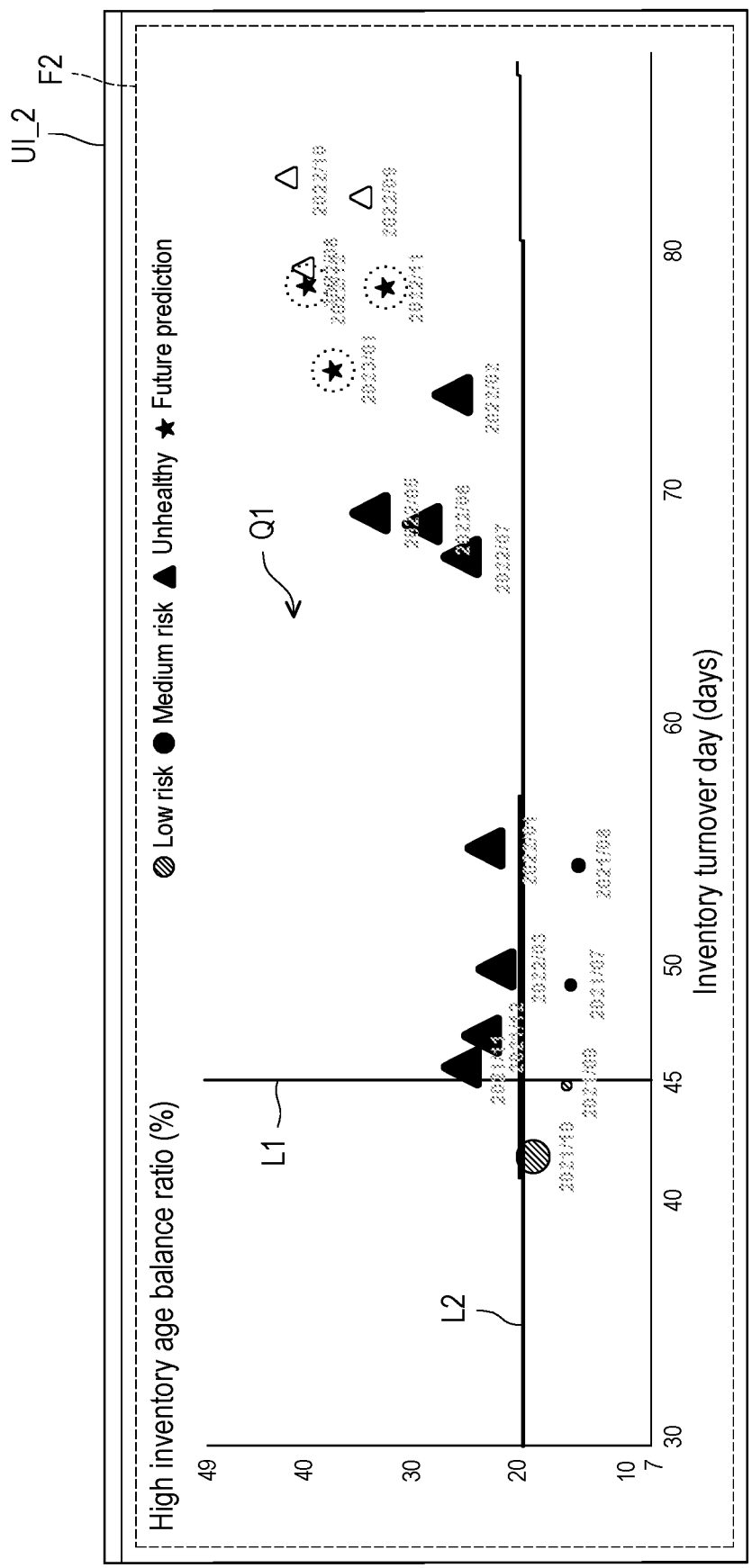
FIG. 7 is a schematic diagram of an inventory health evaluation interface according to an embodiment of the disclosure.

For example, referring to FIG. 7, FIG. 7 is a schematic diagram of an inventory health evaluation interface according to an embodiment of the disclosure. The display 110 may display an inventory health evaluation interface UI_2. The inventory health evaluation interface UI_2 displays a scatter diagram F2. The horizontal axis of the scatter graph F2 represents the inventory turnover day, and the vertical axis of the scatter graph F2 represents the high inventory age balance ratio. The line L1 represents the target inventory turnover day, and the line L2 represents the indicator target value generated according to the clustering result. The line L1 and the line L2 may divide the scatter diagram F2 into four quadrants. As shown in FIG. 7, the inventory health status of multiple future unit period (i.e., January 2023, December 2022, and November 2022 (indicated by a star symbol)) falling in the first quadrant Q1 is unhealthy.

In some embodiments, the processor 130 may display an inventory management simulation interface through the display 110. The inventory management simulation interface provides the function for inventory management personnel to edit the purchase amount prediction value of a future unit period. When the inventory management personnel edits the purchase amount prediction value of the future unit period through the inventory management simulation interface, the processor 130 may calculate multiple inventory indicators of the future unit period and predict the future inventory health status according to the purchase amount input by the inventory management personnel.

Figure 8:
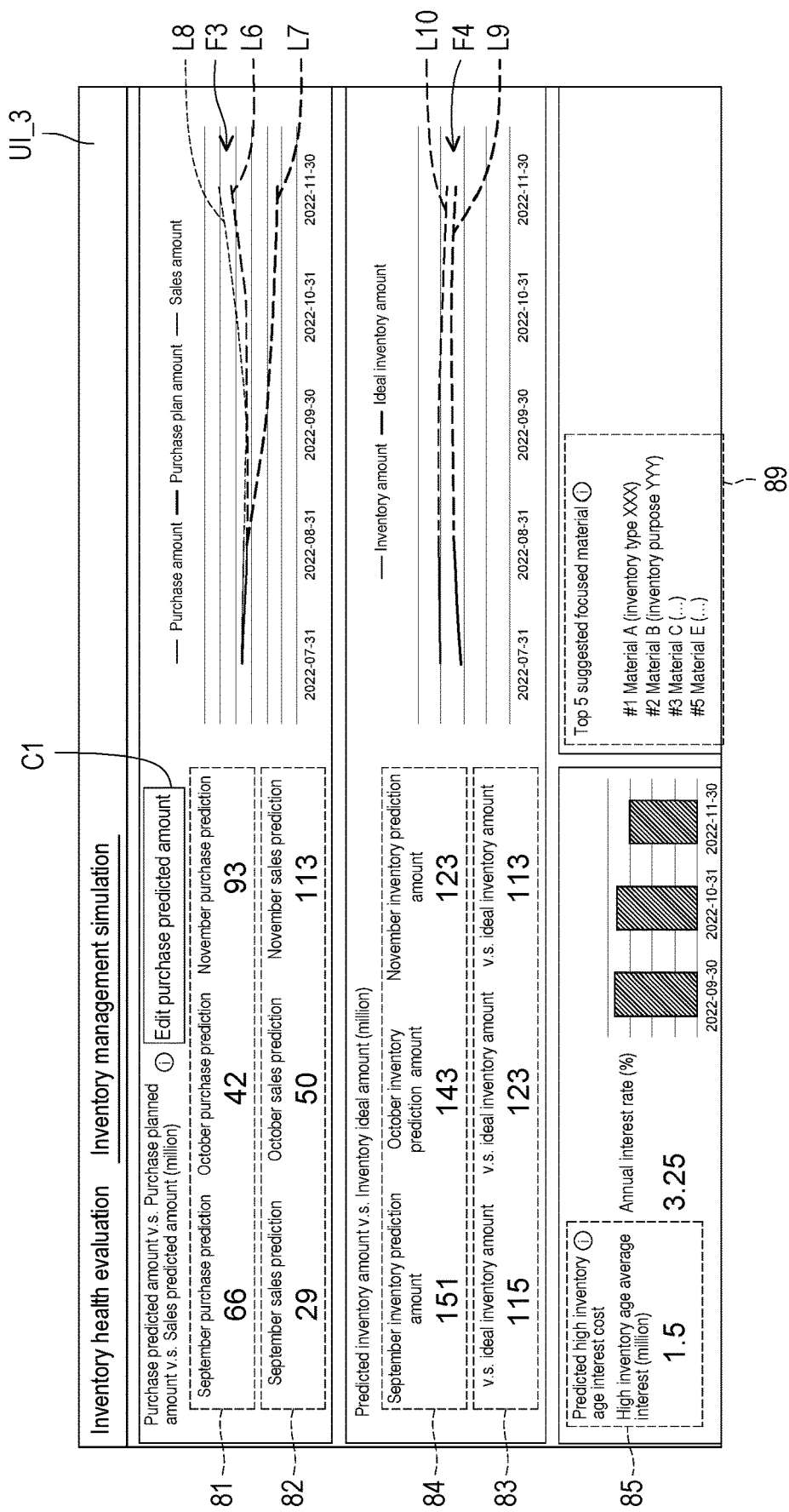
FIG. 8 is a schematic diagram of an inventory management simulation interface according to an embodiment of the disclosure.

For example, FIG. 8 is a schematic diagram of an inventory management simulation interface according to an embodiment of the disclosure. The display 110 may display an inventory management simulation interface UI_3. At the beginning of entering the inventory management simulation interface UI_3, the inventory management simulation interface UI_3 displays the purchase amount prediction value 81 predicted by the purchase amount prediction model. In addition, the inventory management simulation interface UI_3 displays the cost of goods sold prediction values 82 for multiple future unit periods. The inventory management simulation interface UI_3 also displays a graph F3, and the graph F3 includes a dashed line L6 generated based on the purchase amount prediction value 81 predicted by the purchase amount prediction model. The dashed line L7 is the purchase amount prediction value in the next three months estimated according to the purchase order. The dashed line L8 is the cost of goods sold prediction value 82 according to multiple future unit periods. By comparing the dashed lines L6 and L7, it may assist the inventory management personnel to evaluate whether the prediction results generated by the purchase amount prediction model are appropriate. By observing the dashed line L8, it may assist the inventory management personnel to evaluate whether the purchase amount of the future unit period should be adjusted.

The inventory management simulation interface UI_3 displays an edit option C1. The inventory management personnel may edit the purchase amount prediction value 81 in September, October, or November by clicking the edit option C1. The ideal inventory amount 83 of multiple future unit periods displayed on the inventory management simulation interface UI_3 are generated according to the cost of goods sold prediction value 82 of multiple future unit periods. In response to the purchase amount prediction value 81 in September, October, or November being adjusted by the inventory management personnel, the predicted inventory amount 84 and the predicted inventory cost interest 85 of multiple future unit periods displayed in the inventory management simulation interface UI_3 are also correspondingly automatically updated. In addition, the inventory management simulation interface UI_3 also displays a graph F4. The graph F4 includes a dashed line L10 generated based on the predicted inventory amount 84 and a dashed line L9 generated based on the ideal inventory amount 83.

By comparing the dashed line L8 with the dashed line L9, and in conjunction with the predicted inventory cost interest 85 in the lower left corner, it is possible for the inventory management personnel to avoid adjusting the purchase amount of multiple future unit periods too low or too high. In the example shown in FIG. 8, the inventory management personnel may directly simulate the impact of the corrected purchase amount prediction value on the overall inventory and the interest cost, so as to further understand whether the inventory management effectiveness proceeds in an expected direction through the subsequent purchase correction behavior. In addition, the processor 130 may select the suggested focused items according to the inventory information of the inventory items or whether the inventory indicator is a preset condition, and display the relevant information of these suggested focused items in the suggestion field 89 of the inventory management simulation interface UI_3.

The processing procedure of the inventory monitoring method executed by at least one processor is not limited to the examples of the aforementioned embodiments. For example, a portion of the steps (processing) described above may be omitted, and each step may be performed in another order. In addition, any two or more of the above steps may be combined, and a portion of the steps may be corrected or deleted. Alternatively, other steps may also be performed in addition to the above steps.

To sum up, in the embodiment of the disclosure, the indicator target value used to evaluate whether the high inventory age indicators are good or bad may be determined through the clustering results of the clustering model, and the inventory health status of each historical unit period may be determined according to the inventory turnover day and the high inventory age indicator of each historical unit period. In addition, the embodiment of the disclosure may visually display the inventory health status of each historical unit period and various inventory indicators on the inventory health evaluation interface. In this way, the inventory management personnel may quickly and intuitively understand the inventory situation of each historical unit period.

In addition, in the embodiment of the disclosure, the purchase amount prediction model may be trained through a machine learning algorithm, so that the purchase amount prediction model is used to predict the purchase amount prediction value of a future unit period. In this way, since the various inventory indicators of the future unit period may be generated based on the purchase amount prediction value, the inventory management personnel may be warned in advance before inventory abnormalities occur, so that inventory management measures may be carried out early before inventory deterioration, reducing the risk of future operating losses.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. An inventory monitoring method, adapted for an inventory monitoring system comprising a processor, the inventory monitoring method comprising:
    obtaining inventory data of a plurality of historical unit periods;
    generating a plurality of inventory turnover days and a plurality of high inventory age indicators of the historical unit periods according to the inventory data of the historical unit periods;
    establishing a clustering model by using a first machine learning algorithm according to the inventory turnover days and the high inventory age indicators of the historical unit periods, wherein the clustering model is established by clustering the historical unit periods using the inventory turnover days and the high inventory ages indicator of the historical unit periods as model feature variables;
    determining an indicator target value associated with the high inventory age indicators according to a clustering result of the clustering model, wherein the indicator target value is a threshold value utilized to evaluate a high inventory age balance ratio;
    evaluating inventory health status of a first historical unit period among the historical unit periods according to the indicator target value; and
    displaying an inventory health evaluation interface comprising the inventory health status of the first historical unit period, wherein the inventory health evaluation interface comprises a scatter diagram generated according to the inventory turnover days and the high inventory age indicators of the historical unit periods, and the indicator target value is utilized to divide the scatter diagram.

2. The inventory monitoring method according to claim 1, wherein generating the inventory turnover days and the high inventory age indicators of the historical unit periods according to the inventory data of the historical unit periods comprises:
    determining a high-age inventory amount of the first historical unit period according to a target inventory turnover day and inventory data of the first historical unit period; and
    obtaining a first high inventory age balance ratio of the first historical unit period according to a ratio between the high-age inventory amount of the first historical unit period and an inventory amount of the first historical unit period.

3. The inventory monitoring method according to claim 2, wherein evaluating the inventory health status of the first historical unit period among the historical unit periods according to the indicator target value comprises:
    in response to a first inventory turnover day of the first historical unit period being less than a target inventory turnover day and the first high inventory age balance ratio of the first historical unit period being less than the indicator target value, determining that the inventory health status of the first historical unit period is a first risk status; and
    in response to the first inventory turnover day of the first historical unit period being greater than the target inventory turnover day and the first high inventory age balance ratio of the first historical unit period being greater than the indicator target value, determining that the inventory health status of the first historical unit period is a second risk status.

4. The inventory monitoring method according to claim 3, wherein evaluating the inventory health status of the first historical unit period among the historical unit periods according to the indicator target value further comprises:
    in response to the first inventory turnover day of the first historical unit period being greater than the target inventory turnover day but the first high inventory age balance ratio of the first historical unit period being less than the indicator target value, determining that the inventory health status of the first historical unit period is a third risk status; and
    in response to the first inventory turnover day of the first historical unit period being less than the target inventory turnover day but the first high inventory age balance ratio of the first historical unit period being greater than the indicator target value, determining that the inventory health status of the first historical unit period is the third risk status.

5. The inventory monitoring method according to claim 1, further comprising:
    establishing a purchase amount prediction model by using a second machine learning algorithm according to the inventory data of the historical unit periods;
    predicting a purchase amount prediction value of a future unit period by using the purchase amount prediction model; and
    calculating a plurality of predicted inventory indicators of the future unit period according to the purchase amount prediction value of the future unit period.

6. The inventory monitoring method according to claim 5, wherein the predicted inventory indicators of the future unit period comprises a predicted inventory amount, a predicted inventory turnover day, and a predicted high inventory age indicator, and calculating the predicted inventory indicators of the future unit period according to the purchase amount prediction value of the future unit period comprises:

calculating the predicted inventory amount and the predicted inventory turnover day of the future unit period according to the purchase amount prediction value of the future unit period; and calculating the predicted high inventory age indicator of the future unit period according to an item consumption rate and a target inventory turnover day, wherein the inventory monitoring method further comprises:

evaluating a future inventory health status of the future unit period according to the indicator target value and the predicted high inventory age indicator of the future unit period.

7. The inventory monitoring method according to claim 6, wherein calculating the predicted high inventory age indicator of the future unit period according to the item consumption rate and the target inventory turnover day comprises:

calculating a predicted high-age inventory amount of the future unit period according to the item consumption rate and the target inventory turnover day; and determining a predicted high inventory age balance ratio of the future unit period according to a ratio between the predicted high-age inventory amount and the predicted inventory amount of the future unit period.

8. The inventory monitoring method according to claim 7, wherein the item consumption rate comprises a plurality of baseline consumption rates, and calculating the predicted high-age inventory amount of the future unit period according to the item consumption rate and the target inventory turnover day comprises:

calculating the baseline consumption rates respectively corresponding to a plurality of consumption periods according to the inventory data of the historical unit periods;

calculating a plurality of remaining inventory amounts corresponding to a plurality of inventory age classes for the future unit period according to the baseline consumption rates respectively corresponding to the consumption periods; and calculating the predicted high-age inventory amount of the future unit period according to the remaining inventory amounts corresponding to the inventory age classes and the target inventory turnover day.

9. The inventory monitoring method according to claim 6, wherein evaluating the future inventory health status of the future unit period according to the indicator target value and the predicted high inventory age indicator of the future unit period comprises:

determining the future inventory health status of the future unit period according to a comparison result between the predicted high inventory age balance ratio of the future unit period and the indicator target value.

10. An inventory monitoring system, comprising:

a storage device, storing a database and a plurality of instructions;

a processor, coupled to the storage device and accessing the instructions to execute:

obtaining inventory data of a plurality of historical unit periods from the database;

generating a plurality of inventory turnover days and a plurality of high inventory age indicators of the historical unit periods according to the inventory data of the historical unit periods;

establishing a clustering model by using a first machine learning algorithm according to the inventory turnover days and the high inventory age indicators of the historical unit periods, wherein the clustering model is established by clustering the historical unit periods using the inventory turnover days and the high inventory ages indicator of the historical unit periods as model feature variables;

determining an indicator target value associated with the high inventory age indicators according to a clustering result of the clustering model, wherein the indicator target value is a threshold value utilized to evaluate a high inventory age balance ratio;

evaluating inventory health status of a first historical unit period among the historical unit periods according to the indicator target value; and displaying an inventory health evaluation interface comprising the inventory health status of the first historical unit period, wherein the inventory health evaluation interface comprises a scatter diagram generated according to the inventory turnover days and the high inventory age indicators of the historical unit periods, and the indicator target value is utilized to divide the scatter diagram.

11. The inventory monitoring system according to claim 10, wherein the processor further executes:

determining a high-age inventory amount of the first historical unit period according to a target inventory turnover day and inventory data of the first historical unit period; and obtaining a first high inventory age balance ratio of the first historical unit period according to a ratio between the high-age inventory amount of the first historical unit period and an inventory amount of the first historical unit period.

12. The inventory monitoring system according to claim 11, wherein the processor further executes:

in response to a first inventory turnover day of the first historical unit period being less than a target inventory turnover day and the first high inventory age balance ratio of the first historical unit period being less than the indicator target value, determining that the inventory health status of the first historical unit period is a first risk status; and in response to the first inventory turnover day of the first historical unit period being greater than the target inventory turnover day and the first high inventory age balance ratio of the first historical unit period being greater than the indicator target value, determining that the inventory health status of the first historical unit period is a second risk status.

13. The inventory monitoring system according to claim 12, wherein the processor further executes:

in response to the first inventory turnover day of the first historical unit period being greater than the target inventory turnover day but the first high inventory age balance ratio of the first historical unit period being less than the indicator target value, determining that the inventory health status of the first historical unit period is a third risk status; and in response to the first inventory turnover day of the first historical unit period being less than the target inventory turnover day but the first high inventory age balance ratio of the first historical unit period being greater than the indicator target value, determining that the inventory health status of the first historical unit period is the third risk status.

14. The inventory monitoring system according to claim 10, wherein the processor further executes:
- establishing a purchase amount prediction model by using a second machine learning algorithm according to the inventory data of the historical unit periods;
- predicting a purchase amount prediction value of a future unit period by using the purchase amount prediction model; and
- calculating a plurality of predicted inventory indicators of the future unit period according to the purchase amount prediction value of the future unit period.

15. The inventory monitoring system according to claim 14, wherein the predicted inventory indicators of the future unit period comprises a predicted inventory amount, a predicted inventory turnover day, and a predicted high inventory age indicator, and the processor further executes:
- calculating the predicted inventory amount and the predicted inventory turnover day of the future unit period according to the purchase amount prediction value of the future unit period; and
- calculating the predicted high inventory age indicator of the future unit period according to an item consumption rate and a target inventory turnover day; and
- evaluating a future inventory health status of the future unit period according to the indicator target value and the predicted high inventory age indicator of the future unit period.

16. The inventory monitoring system according to claim 15, wherein the processor further executes:
- calculating a predicted high-age inventory amount of the future unit period according to the item consumption rate and the target inventory turnover day; and
- determining a predicted high inventory age balance ratio of the future unit period according to a ratio between the predicted high-age inventory amount and the predicted inventory amount of the future unit period.

17. The inventory monitoring system according to claim 16, wherein the item consumption rate comprises a plurality of baseline consumption rates, and the processor further executes:
- calculating the baseline consumption rates respectively corresponding to a plurality of consumption periods according to the inventory data of the historical unit periods;
- calculating a plurality of remaining inventory amounts corresponding to a plurality of inventory age classes for the future unit period according to the baseline consumption rates respectively corresponding to the consumption periods; and
- calculating the predicted high-age inventory amount of the future unit period according to the remaining inventory amounts corresponding to the inventory age classes and the target inventory turnover day.

18. The inventory monitoring system according to claim 15, wherein the processor further executes:
- determining the future inventory health status of the future unit period according to a comparison result between the predicted high inventory age balance ratio of the future unit period and the indicator target value.

\* \* \* \* \*